United States Patent
Yang et al.

(10) Patent No.: US 11,360,678 B1
(45) Date of Patent: Jun. 14, 2022

(54) ASYNCHRONOUS UNMAP SERVICE

(71) Applicant: VMware, Inc., Palo Alto, CA (US)

(72) Inventors: Long Yang, Fremont, CA (US); Wenguang Wang, Santa Clara, CA (US); Pranay Singh, San Ramon, CA (US); Abhay Kumar Jain, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/179,977

(22) Filed: Feb. 19, 2021

(51) Int. Cl.
G06F 3/06 (2006.01)

(52) U.S. Cl.
CPC ............ *G06F 3/0631* (2013.01); *G06F 3/064* (2013.01); *G06F 3/0604* (2013.01); *G06F 3/0653* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 9,195,592 B1 * | 11/2015 | Weingarten | ......... | G06F 12/0246 |
| 2014/0164730 A1 * | 6/2014 | Gold | ..................... | G06F 3/0683 |
| | | | | 711/171 |

OTHER PUBLICATIONS

Bobbin Zachariah. "Linux Reclaim Storage Space—Ext4 Unmap Feature", https://linoxide.com/file-system/linux-reclaim-storage-space-ext4-unmap-feature, 8 pages, Sep. 14, 2020.
"FITRIM-discard", https://xfs.org/index.php/FITRIM/discard, 2 pages, Feb. 18, 2021.
"Red Hat Enterprise Linux 8 Managing File Systems", https://access.redhat.com/documentation/en-us/red_hat_enterprise_linux/8/html/managing_file_systems/discarding-unused-blocks_managing-file-systems, 181 pages, Dec. 11, 2020.
"Disabling fstrim-under which conditions? Support|SUSE", https://www.suse.com/support/kb/doc/?id=000019447, 3 pages, Feb. 18, 2021.
"Oracle Solaris 11.1 Tunable Parameters Reference Manual", https://docs.oracle.com/cd/E26502_01/html/E29022/chapterzfs-flash.html, 192 pages, May 2013.

* cited by examiner

*Primary Examiner* — Kevin Verbrugge

(57) ABSTRACT

In one set of embodiments, a computer system can periodically run an unmap service configured to scan a subset of bitmaps maintained by a file system of the computer system. As part of scanning each bitmap in the subset, the unmap service can, for each bit in the bitmap: (1) check whether the bit indicates that a corresponding physical block address (PBA) on the storage backend is currently free; (2) upon determining that the bit indicates the PBA is currently free, identify an extent within the bitmap where the PBA resides; (3) check whether an unmap indicator associated with the extent indicates that at least one free PBA in the extent is not currently unmapped in the storage backend; and (4) upon determining that the unmap indicator indicates at least one free PBA in the extent is not currently unmapped in the storage backend, add the PBA to a list of PBAs to be unmapped.

21 Claims, 3 Drawing Sheets

ASYNCHRONOUS UNMAP SERVICE

BACKGROUND

Unless otherwise indicated, the subject matter described in this section is not prior art to the claims of the present application and is not admitted as being prior art by inclusion in this section.

"Unmap" (also known as "trim" or "discard") is a storage protocol command that a file system uses to inform a storage backend such as a solid-state disk (SSD) that one or more physical block addresses (PBAs) on the storage backend are no longer in use by the file system. Upon receiving this command, the storage backend will erase the data blocks corresponding to the specified PBAs and mark those data blocks as invalid/empty, which increases the amount of space available on the storage backend for use by other storage consumers and improves storage media longevity.

In existing file systems, there are generally two approaches for implementing the unmap command: real-time unmapping and manual batch-based unmapping. With real-time unmapping, each time a file maintained on the storage backend is requested to be deleted, the file system executes a file delete procedure that comprises identifying the PBAs on the storage backend where the file data is held, marking those PBAs as free in one or more bitmap data structures (referred to herein as "space bitmaps") maintained by the file system, and synchronously sending one or more unmap commands to the storage backend specifying the identified PBAs, thereby causing the corresponding data blocks to be erased and marked as invalid/empty at the storage level. However, a significant issue with this approach is that the unmap operation is quite slow (and many types of files are quickly deleted after creation), resulting in potentially poor I/O performance. In addition, real-time unmapping can only unmap PBAs at the time those PBAs are deleted/freed by the file system, which means it cannot unmap "old" PBAs that may have been deleted/freed prior to the implementation or enablement of the feature. This is problematic for upgrade scenarios and requires a separate code path to identify and unmap such old PBAs.

With manual batch-based unmapping, the file system exposes a batch unmap command (e.g., "fstrim") that is manually invoked by an individual such as a system administrator. Upon being invoked, the batch unmap command causes a process to scan through the file system's space bitmaps, identify the PBAs that have been marked as free in those bitmaps, and send one or more unmap commands to the storage backend specifying the identified PBAs. However, each time the batch unmap command is run, it will attempt to unmap all PBAs marked as free in the space bitmaps, including PBAs that have already been unmapped (and have not been subsequently re-allocated and freed) via prior invocations of the command. This is redundant and unnecessarily increases the time needed to carry out the batch unmap process. Further, because the batch unmap command is invoked manually by a system administrator, the system administrator must figure out how often to call the command based on various criteria (e.g., the workloads running on the system, the hardware characteristics of the storage backend, etc.), which makes it difficult to use in practice.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for implementing, in a file system, an asynchronous unmap service that is capable of sending unmap commands to a storage backend in an efficient and performant manner. The "asynchronous" qualifier indicates that the service runs periodically in the background and independently from the file system's other (e.g., I/O) processes or threads.

In one set of embodiments, each time it is run, the asynchronous unmap service can scan through a subset S of space bitmaps maintained by the file system for the storage backend, where the space bitmaps contain metadata indicating whether the PBAs of the storage backend are currently free (i.e., are deleted/unallocated at the file system level).

As part of scanning each space bitmap M in subset S, the asynchronous unmap service can identify the PBAs in bitmap M that are marked as free and, for each identified free PBA A, check whether an indicator (referred to herein as an "unmap flag") associated with a portion (i.e., "extent") of the PBA range of bitmap M that includes PBA A is set. If the unmap flag is set (which indicates that all free PBAs in the extent are currently unmapped on the storage backend), the asynchronous unmap service can take no action. However, if the unmap flag is unset, the asynchronous unmap service can add PBA A to a list of PBAs to be unmapped. Upon completing these steps, the asynchronous unmap service can send one or more unmap commands to the storage backend for unmapping the PBAs in the list, set the unmap flags for the extents comprising those PBAs, and proceed with scanning the next space bitmap in subset S.

The foregoing and other aspects of the present disclosure are described in further detail in the sections that follow.

2. Example Computer System and Solution Architecture

Figure 1:
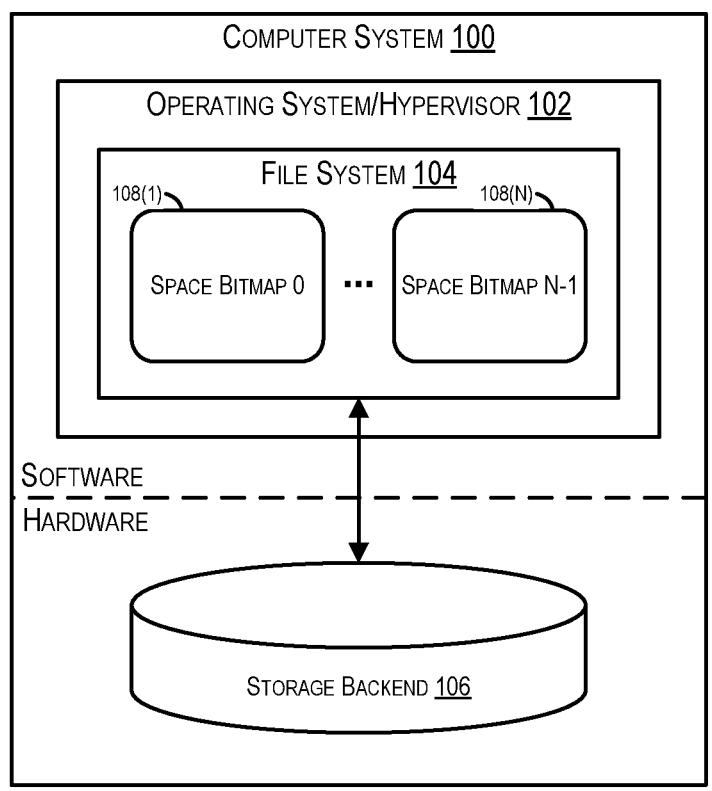
FIG. 1 depicts an example computer system.

FIG. 1 depicts an example computer system 100 in which embodiments of the present disclosure may be implemented. As shown, computer system 100 includes an operating system (OS) or hypervisor 102 with a file system 104 that is configured to organize and manage the storage of data on a storage backend 106. File system 104 includes a number of space bitmaps 108(1)-(N) (ordered according to a bitmap index 0 to N−1) that collectively comprise a sequence of bits which are mapped in a one-to-one fashion to the PBAs of storage backend 106. Each of these bits indicates whether the corresponding PBA is currently free (via, e.g., a bit value of 0) or allocated by file system 104 (via, e.g., a bit value of 1), thereby enabling file system 104 to keep track of its block-level usage of storage backend 106.

For example, assume storage backend 106 has 1 gigabyte (GB) of storage space, the size of each data block on storage backend 106 is 8 kilobytes (KB) (resulting in a total of 131072 data blocks and a PBA range of 0-131071), and each space bitmap 108 is configured to cover 256 megabytes (MB) of storage space. In this scenario, file system 104 can include four free space bitmaps (indexed 0 to 3) for storage backend 106, where bitmap 0 comprises 32768 bits indicating the free status of data blocks/PBAs 0-32767, bitmap 1 comprises 32768 bits indicating the free status of data blocks/PBAs 32768-65535, bitmap 2 comprises 32768 bits indicating the free status of data blocks/PBAs 65536-98303, and bitmap 3 comprises 32768 bits indicating the free status of data blocks/PBAs 98304-131071.

Storage backend 106 may be, e.g., an SSD, a group of SSDs, or any similar storage device or group of storage devices known in the art. For purposes of this disclosure, it is assumed that storage backend 106 accepts the unmap command (or equivalents thereof, such as trim or discard) from file system 104 for erasing and invalidating unused space on its storage media.

As noted in the Background section, existing file systems that send the unmap command to a storage backend like storage backend 106 of FIG. 1 generally do so via real-time unmapping or manual batch-based unmapping. In the case of real-time unmapping, the file system sends the unmap command for unused PBAs to the storage backend at the time of marking those PBAs as free in its space bitmaps (i.e., as part of the file system's file delete procedure); however, this approach results in slow I/O performance and cannot handle upgrade scenarios. In the case of manual batch-based unmapping, the file system exposes a batch unmap command that, when manually invoked by a system administrator or other individual, scans through all of the file system's space bitmaps, identifies the PBAs that have been marked as free in those bitmaps, and sends unmap command(s) to the storage backend specifying the identified PBAs; however, this approach will often try to unmap PBAs that have already been unmapped via prior command invocations (resulting in a waste of time and resources) and can be difficult to use due to its manual nature.

Figure 2:
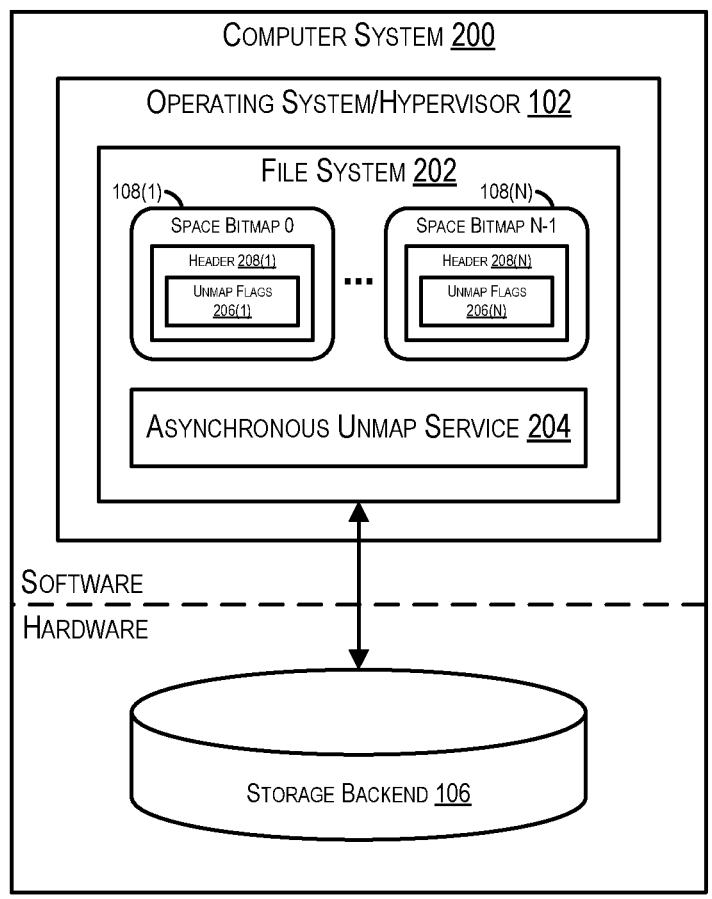
FIG. 2 depicts a computer system that implements the techniques of the present disclosure according to certain embodiments.

To address the foregoing and other similar deficiencies, FIG. 2 depicts a modified version of computer system 100 of FIG. 1 (i.e., computer system 200) that comprises an enhanced file system 202 according to embodiments of the present disclosure. As shown in FIG. 2, file system 202 includes a novel asynchronous unmap service 204, as well as a set of unmap flags 206 in a header portion 208 of each space bitmap 108. Each of these unmap flags is associated with a contiguous fixed-size PBA region, referred to as an extent, within its corresponding space bitmap and indicates whether all of the free PBAs in that extent are currently unmapped in storage backend 106 (via, e.g., a flag value of 1) or at least one free PBA in the extent has not yet been unmapped in storage backend 106 (via, e.g., a flag value of 0).

For example, assume space bitmap 0 (reference numeral 108(1)) covers PBAs 0-32767 of storage backend 106 as mentioned previously and the fixed extent size is 2 MB. In this scenario, the PBA range of space bitmap 0 will be partitioned into 128 extents, each covering a contiguous region of 256 data blocks (i.e., PBAs 0-255 in the first extent, PBAs 256-511 in the second extent, PBAs 512-767 in the third extent, and so on), and bitmap 0 will include 128 unmap flags in its header 208(1) corresponding to those 128 extents. In certain embodiments, each unmap flag can be initialized to 1 (indicating unmapped status) and can be set to 0 whenever file system 202 frees/deletes a data block in the unmap flag's associated extent.

With these unmap flags in place, asynchronous unmap service 204 can periodically run in the background (e.g., independently of file system 202's I/O processes/threads) and, each time it is triggered, can scan through a subset of space bitmaps 108(1)-(N). For instance, on its first execution service 204 can scan through the first X bitmaps indexed 0 to X−1, on its second execution service 204 can scan through the next X bitmaps indexed X to 2X−1, on its third execution service 204 can scan through the next X bitmaps indexed 2X to 3X−1, and so on, where X is a configurable/predefined number. Upon reaching the last free space bitmap N−1, asynchronous unmap service 204 can loop around to the first bitmap 0 again.

For each space bitmap that it scans, asynchronous unmap service 204 can sequentially examine the bits in the body of the bitmap, which indicate the free statuses of the PBAs covered by the bitmap. For each free PBA that it finds within the bitmap (per its corresponding bit value), asynchronous unmap service 204 can retrieve, from the bitmap header, the unmap flag for the extent in which that free PBA resides. Asynchronous unmap service 204 can then check whether the retrieved unmap flag indicates that all of the free PBAs in the extent are currently unmapped in storage backend 106 (e.g., has a flag value of 0).

If the answer is yes, asynchronous unmap service 204 can take no action on the free PBA. However, if the answer is no (i.e., the retrieved unmap flag indicates that one or more free PBAs in the extent have not yet been unmapped in storage backend 106), asynchronous unmap service 204 can add the free PBA to a list of PBAs to be unmapped. Finally, upon scanning through all of the bits/PBAs in the space bitmap, asynchronous unmap service 204 can send one or more unmap commands to storage backend 106 specifying the PBAs in the list (thereby causing those PBAs to be erased and marked as invalid/empty on storage backend 106), unset the unmap flags for the extents including those PBAs in the bitmap header (thereby recording that all of the free PBAs in the extents are now unmapped), and move on to the next space bitmap in the subset of bitmaps to be scanned in its current execution run.

With the high-level approach described above, a number of advantages are realized. First, because asynchronous unmap service 204 operates in the background at periodic intervals (rather than in line with file system 202's delete I/O path), it does not have a significant effect on storage I/O performance like the real-time unmapping approach, because free blocks can be reused by file system 202 even if asynchronous unmap service 204 has not yet unmapped the space. Under certain file system workloads, the same set of data blocks can be allocated and freed multiple times without being unmapped. This is more efficient than the real-time unmapping approach because it avoids sending many unnecessary unmap requests to the storage backend. In certain embodiments, file system 202 can dynamically change how often asynchronous unmap service 204 is run in order to minimize the impact of service 204's operation on the runtime performance of file system 202 and storage backend 106 (discussed in section (5) below).

Second, because asynchronous unmap service 204 uses the set of unmap flags 206 in each space bitmap 108 to only unmap free PBAs that are part of extents which have not yet been fully unmapped, service 204 generally avoids sending redundant unmap commands to storage backend 106 (unlike the manual batch-based unmapping approach) and thus improves the overall efficiency of the process when compared to the manual batch-based unmapping approach.

Third, because asynchronous unmap service 204 is run automatically by file system 202, there is no need for a system administrator or other individual to manually determine when and how often to invoke it, thereby reducing that administrative burden needed to implement it.

It should be appreciated that FIGS. 1 and 2 and the high-level solution description above are illustrative and not intended to limit embodiments of the present disclosure. For example, although storage backend 106 is shown as being an integral part of computer system 100/200, in some embodiments storage backend 106 may be external to computer system 100/200 (e.g., a network-attached storage array). Further, although only a single instance of asynchronous unmap service 204 is shown in FIG. 2, in alternative embodiments file system 202 may implement multiple instances of service 204, such as one for each file system volume/share on storage backend 106. Yet further, the various entities shown in FIGS. 1 and 2 may include sub-components and/or implement functions that are not specifically described. One of ordinary skill in the art will recognize other variations, modifications, and alternatives.

3. Unmap Service Workflow

Figure 3:
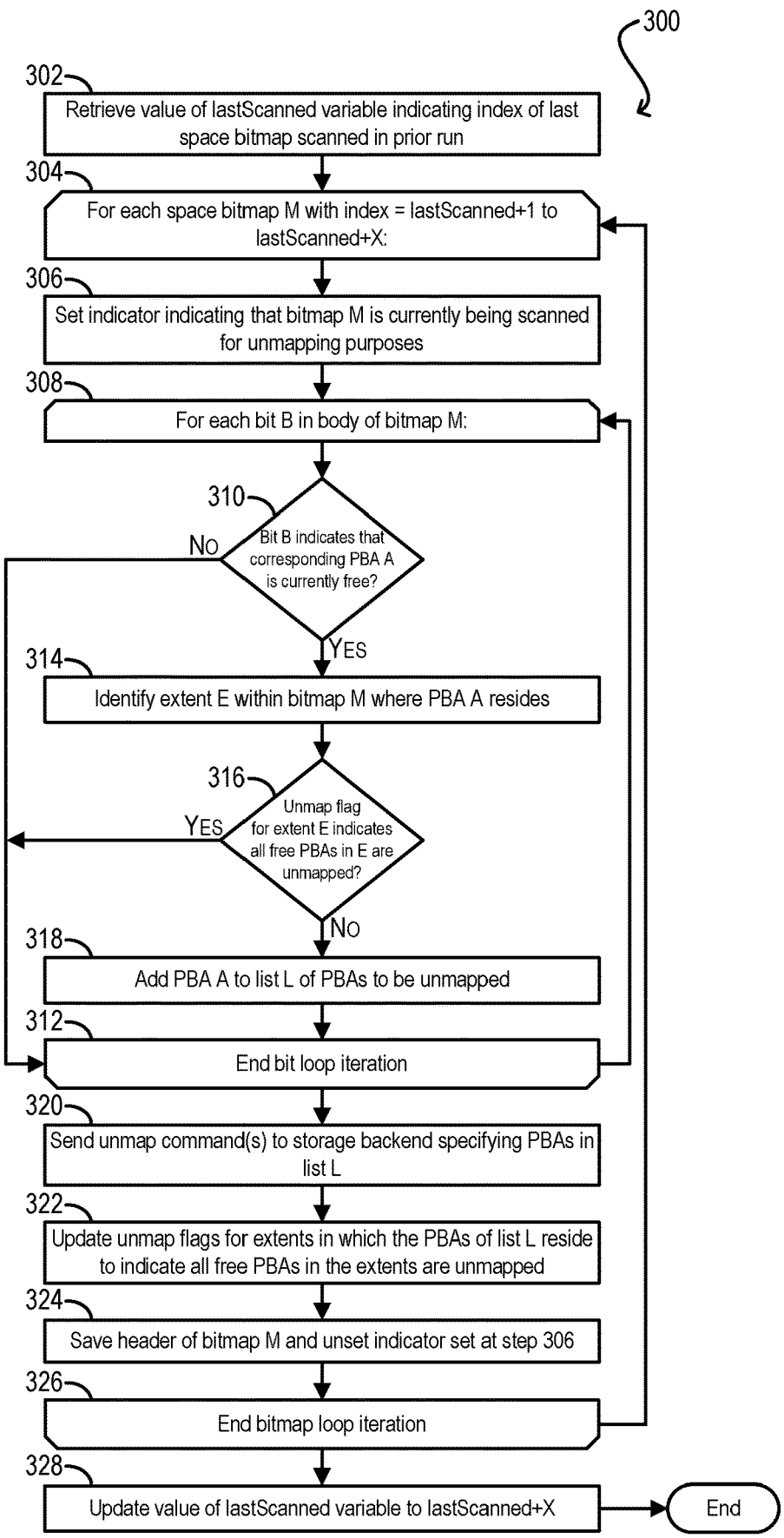
FIG. 3 depicts an asynchronous unmap service workflow according to certain embodiments.

FIG. 3 depicts a workflow 300 that provides additional details regarding the processing that may be performed by asynchronous unmap service 204 of FIG. 2 each time it is executed according to certain embodiments. Workflow 300 assumes that asynchronous unmap service 204 maintains a "lastScanned" variable across executions that holds the index of the last free space bitmap 108 that it scanned in its prior run. Workflow 300 also assumes that asynchronous unmap service 204 is configured to scan a fixed number of X space bitmaps per run. In other embodiments, service 204 may scan a variable number of space bitmaps per run that is dependent on one or more runtime criteria.

Starting with steps 302 and 304, asynchronous unmap service 204 can retrieve the value of the lastScanned variable and enter a first loop for each space bitmap 108 (i.e., bitmap M) with index=lastScanned+1, . . . , lastScanned+X. If asynchronous unmap service 204 reaches the last space bitmap N−1 as part of this first loop, service 204 can automatically circle around to the first bitmap index number 0.

Within the first loop, asynchronous unmap service 204 can set a lock, flag, or some other indicator indicating that service 204 is currently scanning space bitmap M for unmapping purposes (step 306). In this way, asynchronous unmap service 204 can inform other processes/threads of file system 202 that they should not attempt to allocate free PBAs in bitmap M because service 204 may unmap them (resulting in data corruption). Asynchronous unmap service 204 can then enter a second loop for each bit B in the body of space bitmap M (step 308).

Within this second loop, asynchronous unmap service 204 can check whether bit B indicates that the PBA of storage backend 106 mapped to B (i.e., PBA A) is currently free at the file system level (step 310). In a particular embodiment, this can involve checking whether bit B is unset (i.e., has a bit value of 0). If the answer at step 310 is no, asynchronous unmap service 204 can proceed to the end of the current iteration for the second loop (step 312).

However, if the answer at step 310 is yes, asynchronous unmap service 204 can proceed to identify the extent within bitmap M where PBA A resides (i.e., extent E) (step 314) and check whether the unmap flag associated with extent E (as maintained in the header of space bitmap M) indicates that all of the free PBAs in extent E are unmapped (step 316). In a particular embodiment, this can involve checking whether the unmap flag is set (i.e., has a flag value of 1). If the answer at step 316 is yes, asynchronous unmap service 204 can proceed to the end of the current iteration for the second loop (step 312).

However, if the answer at step 316 is no, asynchronous unmap service 204 can add PBA A to a list L of PBAs to be unmapped (step 318). Asynchronous unmap service 204 can then reach the end of the current iteration for the second loop (step 312) and return to the top of the loop (step 308).

Upon processing/scanning all of the bits in space bitmap M, asynchronous unmap service 204 can send one or more unmap commands to storage backend 106 specifying the PBAs in list L, thereby unmapping those PBAs at the storage level (step 320). In addition, asynchronous unmap service 204 can update the unmap flags for the extents in which those PBAs reside to indicate that all of the free PBAs in those extents are now unmapped (step 322). In a particular embodiment, this can involve setting the unmap flags (i.e., changing their values from 0 to 1). Asynchronous unmap service 204 can subsequently save the header of space bitmap M (which includes the updated unmap flags) to storage backend 106 or some other persistent storage medium for crash recovery purposes, unset the lock/flag/indicator previously set for bitmap M at step 306 (step 324), reach the end of the current iteration for the first loop (step 326), and return to the top of the loop (step 304).

Finally, upon processing/scanning all of the space bitmaps in the index range lastScanned+1, . . . , lastScanned+X, asynchronous unmap service 204 can update the value of the lastScanned variable to lastScanned+X (step 328) and workflow 300 can end.

4. Modifications to File System Delete/Free and Allocate Procedures

As mentioned previously, the unmap flag associated with each extent in each free space bitmap 108 indicates whether all of the free PBAs in that extent are currently unmapped in storage backend 106 (via, e.g., a flag value of 1) or at least one free PBA in the extent has not yet been unmapped in storage backend 106 (via, e.g., a flag value of 0). The latter scenario may occur if an unmapped PBA is allocated and freed, without being unmapped again. Accordingly, whenever file system 202 deletes/frees a PBA via its existing delete/free procedure, file system 202 should reset the unmap flag for the PBA's corresponding extent to 0 (if not already 0). This ensures that asynchronous unmap service 204 will unmap the free PBA the next time it runs.

Further, each time file system 202 attempts to access a space bitmap in order to allocate one or more free PBAs to a file via its existing allocate procedure, file system 202 should first check whether asynchronous unmap service 204 is actively processing/scanning that bitmap per the lock/flag/indicator set at step 306 of workflow 300. If the answer is yes, file system 202 should try to allocate space from a different space bitmap that is not currently in use by service 204, which will avoid potential data corruption issues.

5. Unmap Service Throttling

In certain embodiments, file system 202 can run asynchronous unmap service 204 at fixed periodic intervals (e.g., once every 10 seconds). In other embodiments, file system 202 of FIG. 2 can dynamically modify/throttle the frequency at which asynchronous unmap service 204 runs, which can be useful in minimizing the performance impact of its operation on other file system processes.

For instance, in a particular embodiment file system 202 can keep track of statistics regarding the average amount of storage space that asynchronous unmap service 204 unmaps in storage backend 106 per run, as well as determine a high watermark of storage space that can be unmapped per unit time without degrading the performance of file system 202/storage backend 106. Based on these two pieces of information, file system 202 can dynamically adjust how often asynchronous unmap service 104 runs to ensure that service 104 does not unmap more than the high watermark amount of storage space within that watermark's time window.

By way of example, assume that file system 202 determines that (1) asynchronous unmap service 204 unmaps an average of 256 MB in storage backend 106 per run, and (2) the high watermark is 1 GB per minute. In this case, file system 202 can throttle the execution of asynchronous unmap service 204 so that is does not run more often than 1 GB/256 MB=~4 times per minute, thereby avoiding potential performance degradation.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, persistent memory, flash-based nonvolatile memory (e.g., a flash memory card or a solid-state disk), NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
periodically running, by a computer system, an unmap service for unmapping storage space on a storage backend, wherein upon being run the unmap service causes the computer system to scan a subset of bitmaps maintained by a file system of the computer system, and wherein scanning each bitmap in the subset comprises, for each bit in a plurality of bits included in the bitmap:
checking whether the bit indicates that a corresponding physical block address (PBA) on the storage backend is currently free;
upon determining that the bit indicates the PBA is currently free, identifying an extent within the bitmap where the PBA resides;
checking whether an unmap indicator associated with the extent indicates that at least one free PBA in the extent is not currently unmapped in the storage backend; and
upon determining that the unmap indicator indicates at least one free PBA in the extent is not currently unmapped in the storage backend, adding the PBA to a list of PBAs to be unmapped.

2. The method of claim 1 further comprising:
sending one or more unmap commands to the storage backend specifying the list of PBAs to be unmapped, the unmap command causing the storage backend to erase data blocks addressed by the list of PBAs and mark the data blocks as being invalid.

3. The method of claim 2 further comprising, subsequently to sending the one or more unmap commands, updating the unmap indicator to indicate that all free PBAs in the extent are currently unmapped in the storage backend.

4. The method of claim 1 wherein the unmap indicator is stored in a header of the bitmap.

5. The method of claim 1 wherein the file system updates the unmap indicator to indicate that at least one free PBA in the extent is not currently unmapped in the storage backend each time the file system frees one or more PBAs in the extent.

6. The method of claim 1 wherein the unmap service is run as a background process of the file system.

7. The method of claim 1 further comprising:
determining an average amount of storage space unmapped by the unmap service in the storage backend per run;
determining a high watermark of storage space that is allowed to be unmapped by the unmap service within a time window; and
dynamically modifying a frequency at which the unmap service is run based on the average amount of storage space and the high watermark.

8. A non-transitory computer readable storage medium having stored thereon program code executable by a computer system, the program code embodying a method comprising:
periodically running an unmap service for unmapping storage space on a storage backend, wherein upon being run the unmap service causes the computer system to scan a subset of bitmaps maintained by a file system of the computer system, and wherein scanning each bitmap in the subset comprises, for each bit in a plurality of bits included in the bitmap:
checking whether the bit indicates that a corresponding physical block address (PBA) on the storage backend is currently free;
upon determining that the bit indicates the PBA is currently free, identifying an extent within the bitmap where the PBA resides;
checking whether an unmap indicator associated with the extent indicates that at least one free PBA in the extent is not currently unmapped in the storage backend; and
upon determining that the unmap indicator indicates at least one free PBA in the extent is not currently unmapped in the storage backend, adding the PBA to a list of PBAs to be unmapped.

9. The non-transitory computer readable storage medium of claim 8 wherein the method further comprises:
sending one or more unmap commands to the storage backend specifying the list of PBAs to be unmapped, the unmap command causing the storage backend to erase data blocks addressed by the list of PBAs and mark the data blocks as being invalid.

10. The non-transitory computer readable storage medium of claim 9 wherein the method further comprises, subsequently to sending the one or more unmap commands, updating the unmap indicator to indicate that all free PBAs in the extent are currently unmapped in the storage backend.

11. The non-transitory computer readable storage medium of claim 8 wherein the unmap indicator is stored in a header of the bitmap.

12. The non-transitory computer readable storage medium of claim 8 wherein the file system updates the unmap indicator to indicate that at least one free PBA in the extent is not currently unmapped in the storage backend each time the file system frees one or more PBAs in the extent.

13. The non-transitory computer readable storage medium of claim 8 wherein the unmap service is run as a background process of the file system.

14. The non-transitory computer readable storage medium of claim 8 wherein the method further comprises:
determining an average amount of storage space unmapped by the unmap service in the storage backend per run;
determining a high watermark of storage space that is allowed to be unmapped by the unmap service within a time window; and
dynamically modifying a frequency at which the unmap service is run based on the average amount of storage space and the high watermark.

15. A computer system comprising:
a processor; and
a non-transitory computer readable medium having stored thereon program code that, when executed, causes the processor to:
periodically run an unmap service for unmapping storage space on a storage backend, wherein upon being run the unmap service causes the processor to scan a subset of bitmaps maintained by a file system of the computer system, and wherein scanning each bitmap in the subset comprises, for each bit in a plurality of bits included in the bitmap:
checking whether the bit indicates that a corresponding physical block address (PBA) on the storage backend is currently free;
upon determining that the bit indicates the PBA is currently free, identifying an extent within the bitmap where the PBA resides;
checking whether an unmap indicator associated with the extent indicates that at least one free PBA in the extent is not currently unmapped in the storage backend; and
upon determining that the unmap indicator indicates at least one free PBA in the extent is not currently unmapped in the storage backend, adding the PBA to a list of PBAs to be unmapped.

16. The computer system of claim 15 wherein the unmap service further causes the processor to send one or more unmap commands to the storage backend specifying the list of PBAs to be unmapped, the unmap command causing the storage backend to erase data blocks addressed by the list of PBAs and mark the data blocks as being invalid.

17. The computer system of claim 16 wherein the unmap service further causes the processor to, subsequently to sending the one or more unmap commands, update the unmap indicator to indicate that all free PBAs in the extent are currently unmapped in the storage backend.

18. The computer system of claim 15 wherein the unmap indicator is stored in a header of the bitmap.

19. The computer system of claim 15 wherein the file system updates the unmap indicator to indicate that at least one free PBA in the extent is not currently unmapped in the storage backend each time the file system frees one or more PBAs in the extent.

20. The computer system of claim 15 wherein the unmap service is run as a background process of the file system.

21. The computer system of claim 15 wherein the program code further causes the processor to:
determine an average amount of storage space unmapped by the unmap service in the storage backend per run;
determine a high watermark of storage space that is allowed to be unmapped by the unmap service within a time window; and
dynamically modify a frequency at which the unmap service is run based on the average amount of storage space and the high watermark.

\* \* \* \* \*